(12) United States Patent
Aoyagi et al.

(10) Patent No.: US 12,356,267 B2
(45) Date of Patent: Jul. 8, 2025

(54) COMMUNICATION CONTROL FOR DYNAMICALLY DETERMINING SSC MODE

(71) Applicant: RAKUTEN MOBILE, INC., Tokyo (JP)

(72) Inventors: Kenichiro Aoyagi, Tokyo (JP); Jin Kusumi, Tokyo (JP); Jin Nakazato, Tokyo (JP); Takuya Miyazawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/796,776

(22) PCT Filed: May 30, 2022

(86) PCT No.: PCT/JP2022/021859
§ 371 (c)(1),
(2) Date: Aug. 1, 2022

(87) PCT Pub. No.: WO2023/233442
PCT Pub. Date: Dec. 7, 2023

(65) Prior Publication Data
US 2024/0187947 A1 Jun. 6, 2024

(51) Int. Cl.
*H04W 36/08* (2009.01)
*H04W 24/02* (2009.01)
*H04W 36/18* (2009.01)
*H04W 76/38* (2018.01)

(52) U.S. Cl.
CPC ........... *H04W 36/08* (2013.01); *H04W 24/02* (2013.01); *H04W 36/18* (2013.01); *H04W 76/38* (2018.02)

(58) Field of Classification Search
CPC ..... H04W 36/08; H04W 76/38; H04W 24/02; H04W 36/18
See application file for complete search history.

(56) References Cited

U.S. PATENT DOCUMENTS

| | | | |
|---|---|---|---|
| 2019/0182723 A1* | 6/2019 | Sharma | H04W 36/0033 |
| 2022/0303855 A1* | 9/2022 | Raymond | H04W 8/24 |
| 2022/0322195 A1* | 10/2022 | Tullberg | H04W 36/08 |
| 2023/0397086 A1* | 12/2023 | Kim | H04W 40/24 |
| 2023/0422128 A1* | 12/2023 | Raymond | H04W 36/0072 |
| 2024/0276564 A1* | 8/2024 | Li | H04W 28/0268 |

FOREIGN PATENT DOCUMENTS

JP 2019-528018 A 10/2019

* cited by examiner

*Primary Examiner* — Ajay Cattungal
(74) *Attorney, Agent, or Firm* — Sughrue Mion, PLLC

(57) ABSTRACT

An information processing apparatus executes an acquiring process, a prediction process, and a determination process. The acquiring process is a process for acquiring, from a communication apparatus, a communication status for the communication apparatus before handover. The prediction process is a process for predicting, based on the communication status before handover, a communication status for the communication apparatus after handover using machine learning. The determination process is a process for determining, based on the predicted communication status after handover, an Service and Session Continuity (SSC) mode to be used by the communication apparatus after handover.

16 Claims, 10 Drawing Sheets

COMMUNICATION CONTROL FOR DYNAMICALLY DETERMINING SSC MODE

TECHNICAL FIELD

The present disclosure relates to a communication control technique for dynamically determining an SSC mode.

BACKGROUND ART

Service and Session Continuity (SSC) is specified in Fifth Generation (5G) mobile communication system, which is being standardized by Third Generation Partnership Project (3GPP). The SSC is a technology for mobility management for a communication terminal moving and changing a base station to be connected. Three types of the SSC modes have been specified (Patent Literature 1)

SSC Mode 1 is a mode having Internet Protocol (IP) address continuity with some delay. SSC mode 2 is a mode having no IP address continuity with a delay (i.e., having a period of no communication). SSC mode 3 is a mode having no IP address continuity with less delay.

LISTING OF REFERENCES

Patent Literature

PATENT LITERATURE 1: Laid-open Publication of Japanese patent Application No. 2019-528018 A

SUMMARY OF THE INVENTION

Problems to be Solved by the Invention

Conventionally, an SSC mode to be used is pre-set by a telecommunication carrier that provides communication services, considering a network configuration and other factors. However, such a pre-set SSC mode may not be appropriate for a communication status, such as a traffic environment in which the communication terminal communicates, or a communication service used by the terminal. For example, in a case where the communication terminal that is using a communication service having no real-time (i.e., low latency) requirement uses SSC mode 3, the terminal may be configured to use SSC mode 1 or SSC mode 2 instead of SSC mode 3.

Therefore, in a case where an SSC mode to be used by each communication terminal is determined in advance, communication resources in a network may not be used efficiently and load on the network may become high.

The present invention has been made in order to the above mentioned problems and an object thereof is to provide a technique for dynamically determining an SSC mode based on a communication status.

Solution to Problem

In order to solve the above mentioned problems, according to one aspect of the present disclosure, there is provided an information processing apparatus which comprises: at least one processor; wherein the at least one processor being configured execute an acquiring process, a prediction process, and a determination process. The acquiring process is a process for acquiring, from a communication apparatus, a communication status for the communication apparatus before handover. The prediction process is a process for predicting, based on the communication status before handover, a communication status for the communication apparatus after handover using machine learning. The determination process is a process for determining, based on the predicted communication status after handover, an SSC (Service and Session Continuity) mode to be used by the communication apparatus after handover.

In order to solve the above mentioned problems, according to another aspect of the present disclosure, there is provided a control apparatus which comprises: at least one processor; wherein the at least one processor being configured execute an acquiring process, a determination process, and a session management process. The acquiring process is a process for acquiring, from another apparatus, a predicted communication status for a communication apparatus after handover, which is predicted by machine learning based on a communication status for the communication apparatus before handover. The determination process is a process for determining, based on the predicted communication status after handover, an SSC (Service and Session Continuity) mode to be used by the communication apparatus after handover. The session management process is a process for performing session management for the communication apparatus to perform data communication in accordance with the determined SSC mode.

In order to solve the above mentioned problems, according to another aspect of the present disclosure, there is provided a computer-implemented information processing method which comprises: acquiring, from a communication apparatus, a communication status for the communication apparatus before handover; predicting, based on the communication status before handover, a communication status for the communication apparatus after handover using machine learning; and determining, based on the predicted communication status after handover, an SSC (Service and Session Continuity) mode to be used by the communication apparatus after handover.

Advantageous Effect of the Invention

According to the present invention, it makes it possible to dynamically determine an SSC mode based on a communication status.

DESCRIPTION OF EMBODIMENTS

Figure 1:
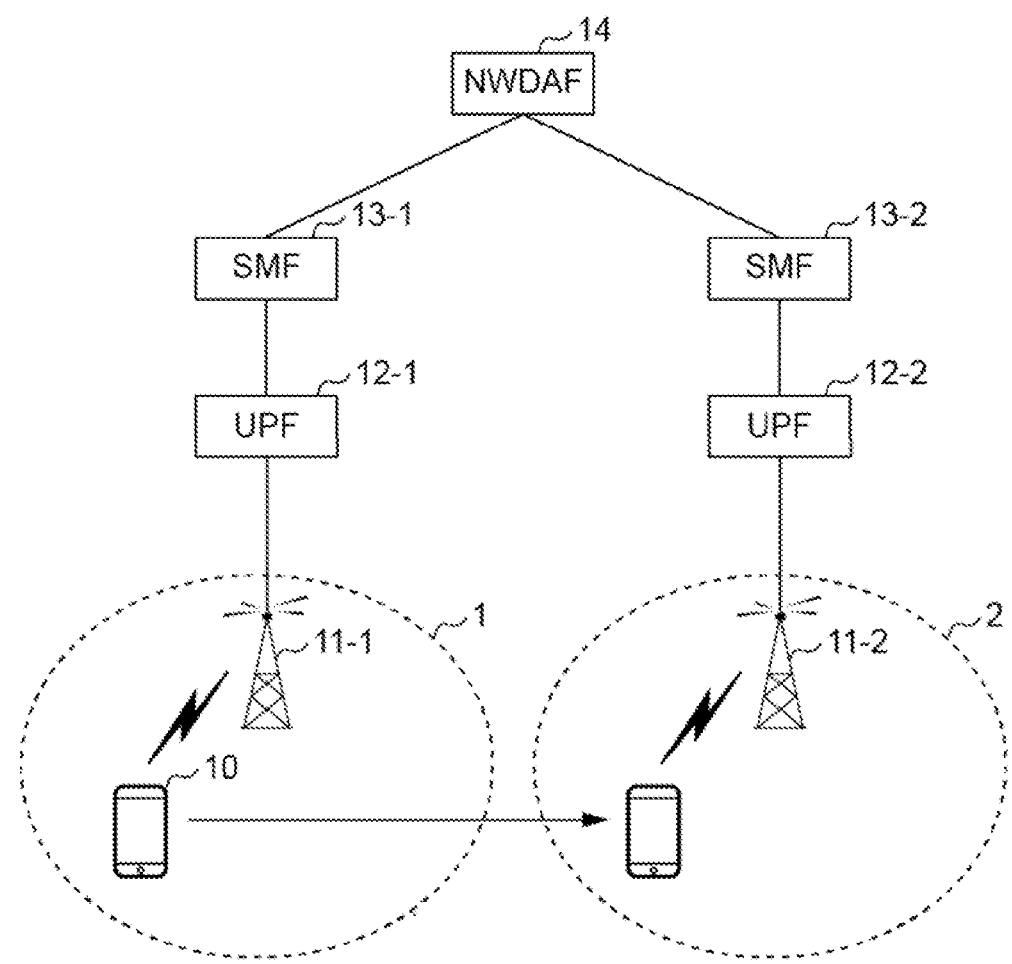
FIG. 1 illustrates an example network configuration according to an embodiment of the present disclosure

Hereinafter, embodiments of the present disclosure will be described in detail with reference to the accompanying drawings. Among the constituent elements disclosed below, those having the same function are denoted by the same reference numerals, and a description thereof is omitted. It should be noted that the embodiments disclosed herein are illustrative examples as means for implementing the present disclosure, and should be appropriately modified or changed depending on a configuration and various conditions of an apparatus to which the present disclosure is applied, and the present disclosure is not limited to the following embodiments. Furthermore, it should be noted that all of the combinations of features described in the following embodiments are not necessarily essential to the solution of the present disclosure.

In the present embodiment, as a network to which the technology according to the present disclosure applies, Fifth Generation (5G) mobile network (5G network) standardized in Third Generation Partnership Project (3GPP) is assumed. Note that the technology in the present disclosure may be applied to networks other than 5G network.

Network Configuration

FIG. 1 illustrates an example of a network configuration according to the present embodiment. The network comprises a user terminal 10 (a communication apparatus, also referred to as a UE), base stations (also referred to as BSs) 11-1, 11-2, User Plane Function (UPF) nodes 12-1, 12-2, Session Management Function (SMF) nodes 13-1, 13-2, and a Network Data Analytic Function (NWDAF) node 14. The base stations 11-1 and 11-2 forms radio network in cells 1 and 2, respectively. The UPF nodes 12-1, 12-2, the SMF nodes 13-1, 13-2, and the NWDAF node 14 are nodes that function as Network Functions (NFs) in the 5G core network. In the following description, unless otherwise specified, the base stations 11-1 and 11-2 are referred to as the base station 11, the UPF nodes 12-1 and 12-2 are referred to as the UPF node 12, and SMF nodes 13-1 and 13-2 are referred to as the SMF node 13. Note that the example network configuration in FIG. 1 illustrate functional configuration and not necessarily physical configuration.

The UE 10 is a device such as a smartphone or a tablet, for example, and is configured to be able to communicate with the base station 11. The UE10 has a display device (e.g., a display screen), such as a liquid crystal display (LCD). A user may perform an operation using a Graphic User Interface (GUI) equipped on the liquid crystal display. The operation may include tapping, sliding, scrolling, or other operations using a finger, stylus, or other device, as well as various operations onto content such as displayed images. The UE 10 may be a device such as a tablet terminal or a notebook PC. The UE 11 may be equipped with a separate display device.

Figure 9:
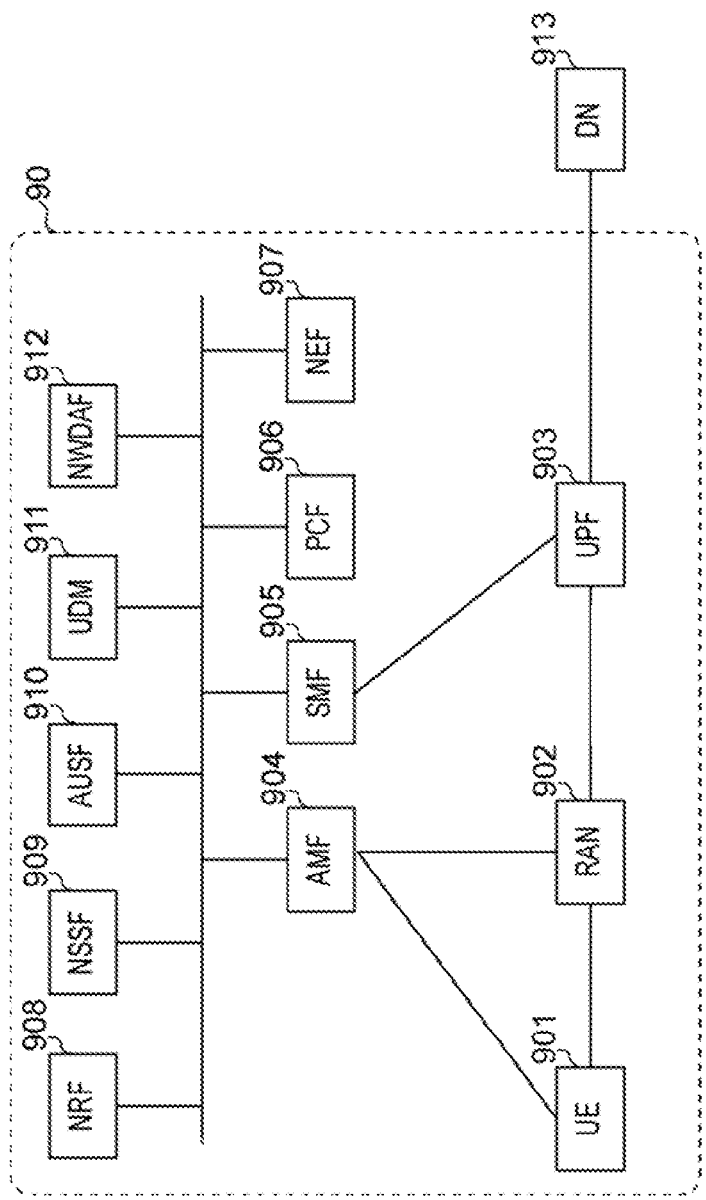
FIG. 9 illustrates a schematic example of a 5G core network.

FIG. 9 illustrates a schematic example of the 5G network. The 5G network 90 shown in FIG. 9 comprises a UE 901, a Radio Access Network (RAN) 902, an UPF 903, and an Access and Mobility Management Function (AMF) 904, a SMF 905, a Policy Control Function (PCF) 906, a Network Exposure Function (NEF) 907, Network Repository Function (NRF) 908, a Network Slice Selection Function (NSSF) 909, an Authentication Server Function (AUSF) 910, a Unified Data Management (UDM) 911, and a NWDAF 912. The UPF 903 is connected to a Data Network (DN) 913.

The UE 10 in FIG. 1 is a device configured to function as the UE 901. The base station 11 includes at least a device configured to perform a Radio Unit (RU) which is part of the RAN 902 functions. The UPF node 12 is a device that configured to function as the UPF 903, and the SMF node 13 is a device configured to function as the SMF 905, and the NWDAF node 14 is a device configured to function as the NWDAF 912. The UPF 902 is responsible for routing and data forwarding for interconnecting the DN 913. The SMF 905 is responsible for session management (e.g., establishment and disconnection) and IP address assignment for the UE 901, and selection and control of the UPF 903 for data transfer. The NWDAT 912 is responsible for data collection and data analysis.

In the present embodiment, it is assumed that the UE 10 moves from the cell 1 to the cell 2, wherein an SSC mode is preset for the UE 10. In 3GPP, three types of SSC modes are specified, each of which is described below with reference to FIG. 2. The SSC mode set for the UE10 in the cell 1 is to be used in the cell 2. However, in consideration of a communication status, such as a traffic environment in which the UE10 communicates or a communication service used by the UE 10, it is not always appropriate to use the same SSC mode in the cell 2 as in the cell 1. For example, in a case where the UE 10 using a communication service having no real-time (i.e., low latency) requirement uses SSC mode 3, the UE 10 may be configured to use SSC mode 1 or SSC mode 2 instead of SSC mode 3 in the cell 2 after handover.

In the present embodiment, the NWDAF node 14 (an information processing equipment) is configured to predict a communication status for the UE 10 after handover based on a communication status for UE10 before handover using machine learning. The NWDAF node 14 is also configured to determine (select) the optimal SSC mode for the UE 10 after handover based on the predicted communication status. Alternatively, the SMF node 13-1 (a control apparatus) may be configured to determine (select) the optimal SSC mode for the UE 10 after handover based on the communication status predicted by the NWDAF node 14.

In the following, examples of apparatus configurations and specific processing procedures to achieve the above-described operations are described.

<SSC Mode Overview>

Figure 2:
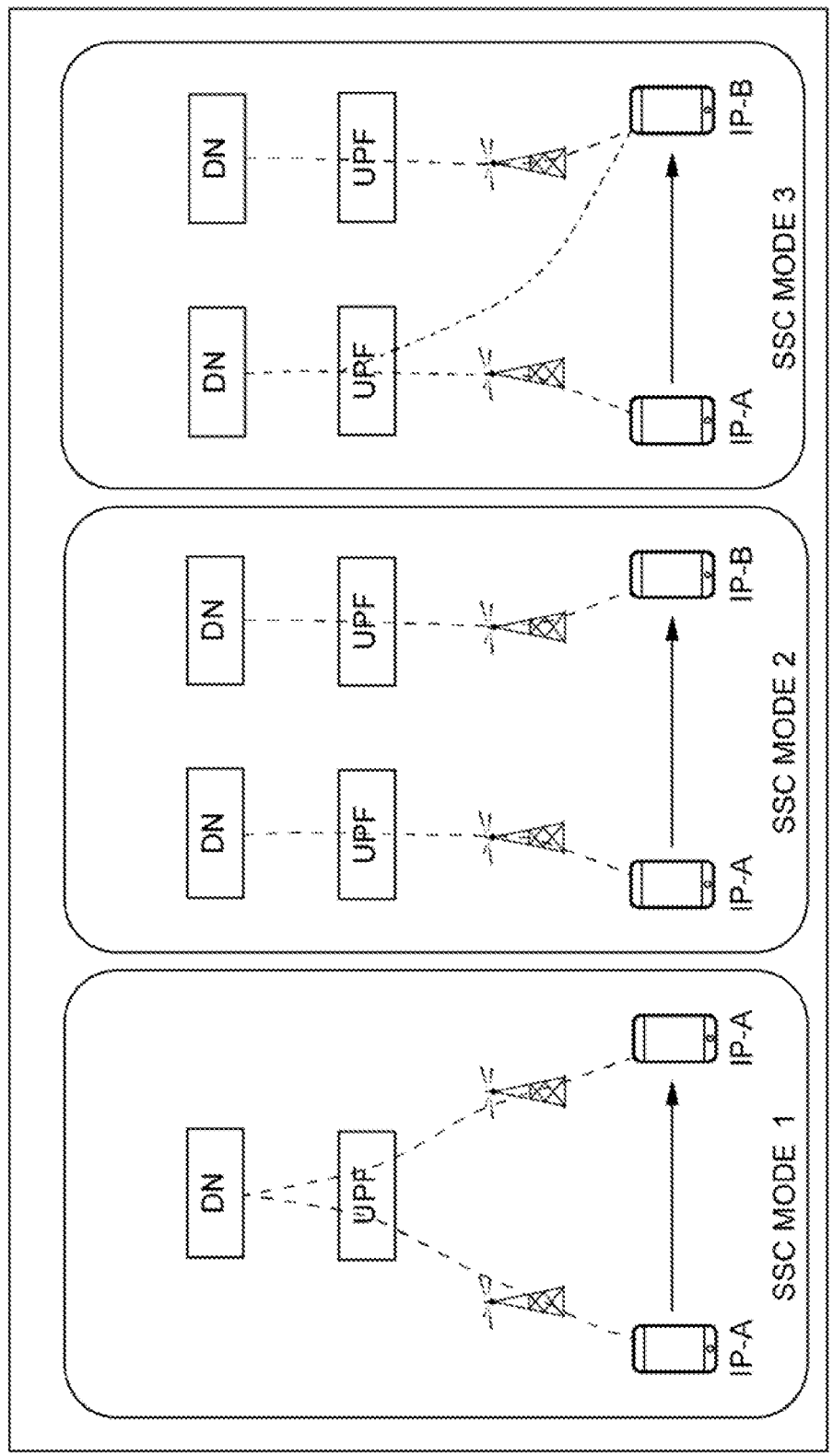
FIG. 2 illustrates a diagram for explaining SSC modes.

Referring to FIG. 2, three types of the SSC modes specified in 3GPP are explained. FIG. 2 illustrates a diagram for explaining the SSC modes.

SSC mode 1 (left portion of FIG. 2) is a mode in which the connected UPF is maintained during handover (see dotted line). SSC mode 1 has been used in 4G (Long Term Evolution (LTE)) standardized in 3GPP. In the case of SSC mode 1, Data Network (DN) sessions and the IP address used by the UE 10 are maintained, but delay may occur.

SSC mode 2 (center portion of FIG. 2) is a mode in which the UPF and the DN are switched before and after handover (see dotted line). For example, the UPF is switched to another UPF closer to the base station to be switched to. In the case of SSC mode 2, an instantaneous disconnection (i.e., no communication timing) due to DN session reconnection occurs. In the case of SSC mode 2, since the IP address of the UE 10 needs to be changed before and after handover, it is necessary to prepare two IP addresses.

SSC mode 3 (right portion of FIG. 2) is a mode in which the UPF and the DN are switched before and after handover, like SSC mode 2. Unlike SSC mode 2, in SSC mode 3, the UPF is maintained before and after handover (see single dotted line), thereby an instantaneous disconnection due to DN session reconnection may be reduced. After the connection with the DN in the new area is completed, communication with the DN in the existing area is disconnected. In the case of SSC mode 3, network resources such as sessions and UPFs are temporarily duplicated. In addition, in the case of SSC mode 3, as in the case of SSC mode 2, since the IP address of the UE 10 needs to be changed before and after handover, it is necessary to prepare two IP addresses.

<Hardware Configuration of NWDAF Node and SMF Node>

Figure 3:
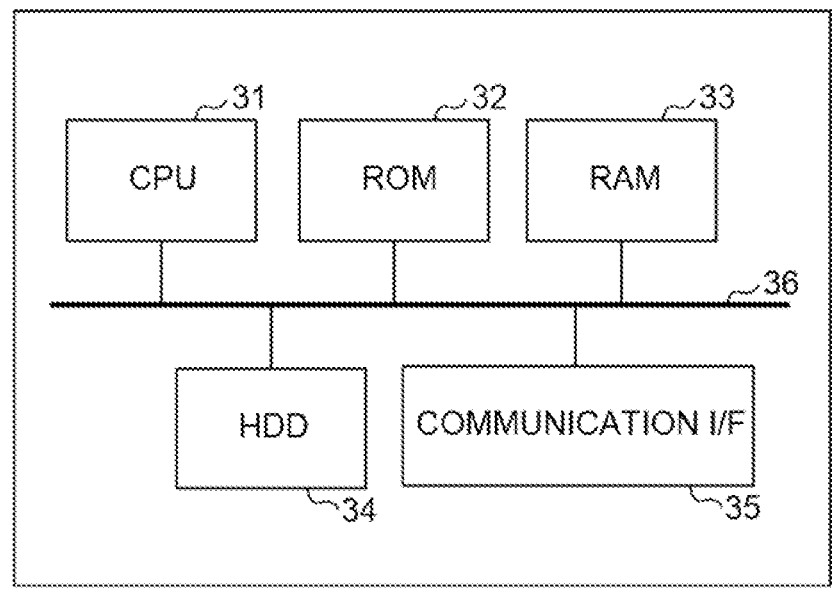
FIG. 3 illustrates an example hardware configuration of a NWDAF node according to an embodiment of the present disclosure.

FIG. 3 illustrates an example of a hardware configuration of the NWDAF node 14 according to the present embodiment. The SMF node 13 may have a similar hardware configuration.

As shown in FIG. 3, the NWDAF node 14 consists of a Central Processing (CPU) 31 and a Read Only Memory (ROM) 32, a Random Access Memory (RAM) 33, a Hard Disc Drive (HDD) 34, a communication interface (I/F) 35 and a system bus 36. The NWDAF node 14 may also be equipped with an external memory.

The CPU 31 is composed of one or more processors and comprehensively controls operations in the NWDAF node 14. The CPU 31 controls the components (i.e., the components 32 to 37) via the system bus 36 which is a data transmission path. The CPU 31 may be replaced by one or more processors such as an Application Specific Integrated Circuit (ASIC), a Field Programmable Gate Array (FPGA), a Digital Signal Processor (DSP), and Graphics Processing Unit (GPU).

The ROM 32 is a nonvolatile memory that stores a control program or the like which is necessary for the CPU 31 executing processing. The program may be stored in a non-volatile memory such as the HDD 34, a Solid-State Drive (SSD), or in an external memory such as a removable storage medium (not shown).

The RAM 33 is a volatile memory and functions as the main memory, work area, etc., for the CPU 31. In other words, the CPU 31, when executing processing, loads the necessary programs, etc., stored in the ROM 32 onto the RAM 33 and executes the program to realize various functional operations.

The HDD 34 stores, for example, various data, various information, etc., necessary for the CPU 31 executing processing. Also, the HDD 34 stores, for example, various data, various information, etc., obtained through processing by the CPU 31. The storage may be performed together with the HDD 34, or instead of the HDD 34 using external memory such as the SSD or other non-volatile memory or removable storage media.

The communication I/F 35 is an interface that controls communication between the NWDAF node 14 and external devices.

Note that the NWDAF node 14 and the SMF node 13 may be equipped with a dedicated hardware to perform their respective functions, or they may perform some of their functions by a hardware and others by a computer running a program. Alternatively, all functions may be performed by a computer and a program.

<Functional Configuration of NWDAF Node>

Figure 4:
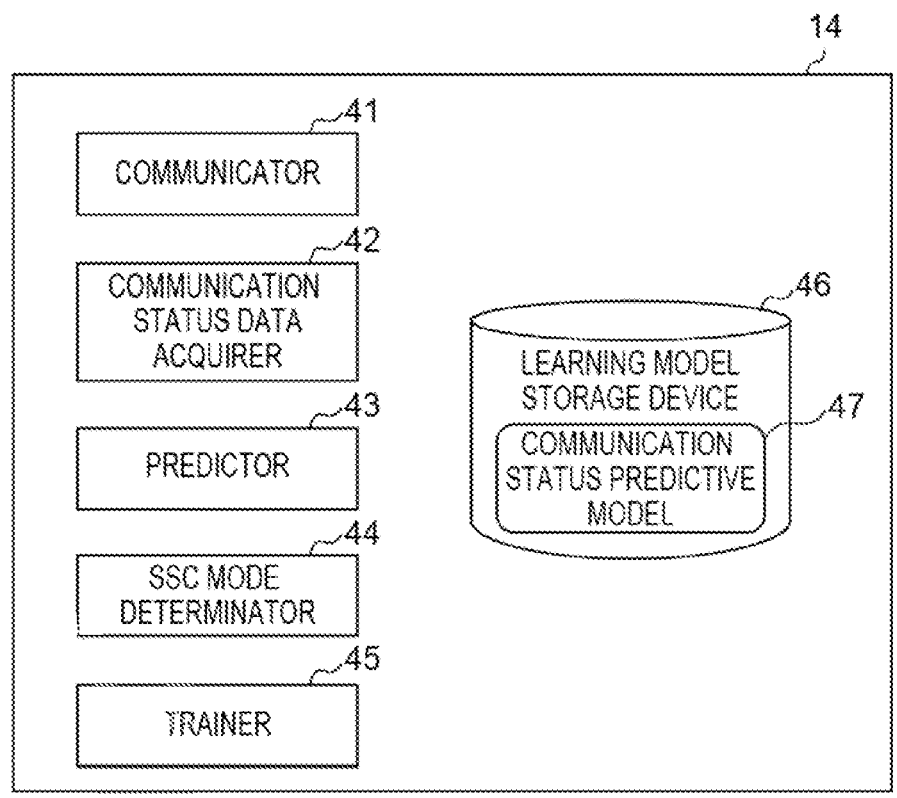
FIG. 4 illustrates an example functional configuration of a NWDAF node according to an embodiment of the present disclosure.

FIG. 4 illustrates an example of a functional configuration of the NWDAF node 14. Each of the functions of the NWDAF node 14 is, for example, a logical function realized by the hardware of the NWDAF node 14, and may be realized by the CPU 31 executing a program stored in the ROM 32, etc. In the present embodiment, the NWDAF node 14 has the following functional configurations: a communicator 41, a communication status data acquirer 42, a predictor 43, an SSC mode determinator 44, a trainer 45, and a learning model storage device 46. The learning model storage device 46 stores a trained communication status predictive model 47.

The communicator 41 transmits and receives signals (e.g., signals related to data, packets, etc.) via the communication I/F 35. The communication status data acquirer 42 acquires communication status data for the UE 10 from the data received by the communicator 41. The communication status data is described below. The predictor 43 applies the communication status data acquired by the communication status data acquirer 42 to the communication status predictive model 47 to predict (infer) communication status after the point in time when the applied communication status data is acquired. In the present embodiment, the communication status data acquired by the communication status data acquirer 42 indicates a communication status before handover, and the predictor 43 predicts a communication status after handover. The SSC mode determinator 44 determines the SSC mode based on communication status after handover predicted by the predictor 43. The SSC mode determinator 44 determines (selects) the optimal SSC mode after handover. The trainer 45 compares the communication status predicted by the predictor 43 with the actual communication status and, based on the result of the comparison, retrains (relearns) the communication status predictive model 47. The learning model storage device 46 may consist of the RAM 33. The communication status predictive model 47 stored in the learning model storage device 46 is a learning model for machine learning. The communication status predictive model 47 is described below.

The following is an example of the communication status data acquired by the communication status data acquirer 42. The communication status data according to the present embodiment includes data related to the UE 10. Further, the communication status data according to the present embodiment may include data related to the communication environment of the UE 10.

The data related to the UE10 includes an operation history (an operation status) of the UE10 by a user. The operation history may include, for example, an operation on the display screen (screen ON or OFF), an operation time on the display screen, one or more connection destinations of the UE10 (handover history (e.g., connected base station)), an amount of communication packets (data communication rate), and an amount of cached data, and data acquired by Deep Packet Inspection (DPI). The data related to the UE10 also may include a mobility feature of the UE 10 (e.g., location information and/or mobile speed). The location information may be acquired by the UE 10 using signals from a Global Positioning System (GPS) satellite (not shown), and the mobile speed may be acquired based on the location information. The location information may also be acquired by measuring a received wave strength (e.g., Received Signal Strength Indicator (RSSI)) of a given beacon at the UE 10.

The data related to the UE 10 is appended with time information (indicating time zone, time stamp, etc.). For example, the time information indicates, in the case of the operation history, the time when the operation was performed, and in the case of the location information and the mobile speed, the time when the location information and the mobile speed were acquired.

The data related to the communication environment of the UE 10 includes a traffic environment in the area where the UE 10 is located (e.g., congestion in the area). The traffic environment may be acquired, for example, from a telecommunications carrier. The data related to the communication environment may include a type of communication area of the UE 10 (e.g., an urban area or a suburban area). The data related to the communication environment is appended with time information like the data related to the UE 10.

<Functional Configuration of SMF Node>

Figure 5:
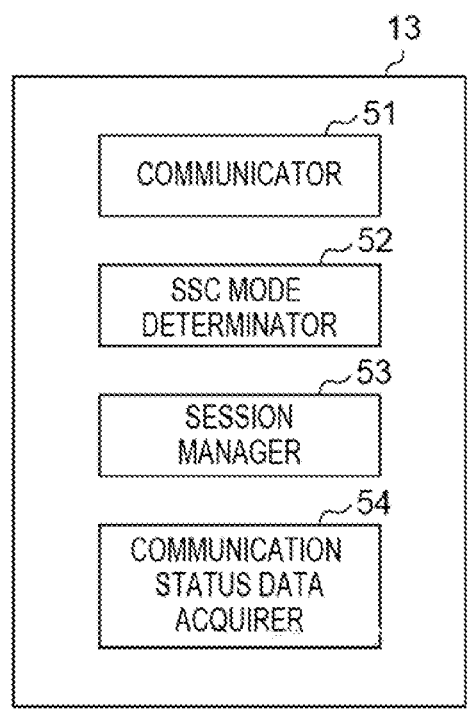
FIG. 5 illustrates an example functional configuration of an SMF node according to an embodiment of the present disclosure.

FIG. 5 illustrates an example of a functional configuration of the SMF node 13. Each of the functions of the SMF node 13 is, for example, a logical function realized by the hardware of the SMF node 13, and may be realized by the CPU 31 executing executes a program stored in the ROM 32, etc. In the present embodiment, the SMF node 13 has the following functional configurations: a communicator 51, an SSC mode determinator 52, a session manager 53, and a communication status data acquirer 54.

The communicator 51 transmits and receives signals (e.g., signals related to data, packets, etc.) via the communication I/F 35. The SSC mode determinator 52 determines (selects) the optimal SSC mode after handover based on the communication status of the UE 10 after handover predicted by the NWDAF node 14. The session manager 53 manages (e.g., establishes and disconnects) sessions for the UE 10. The communication status data acquirer 54 acquires communication status data for the UE 10 from the data received by the communicator 51.

<Process Flow (NWDAF Node 14 Determining SSC Mode)>

Figure 6:
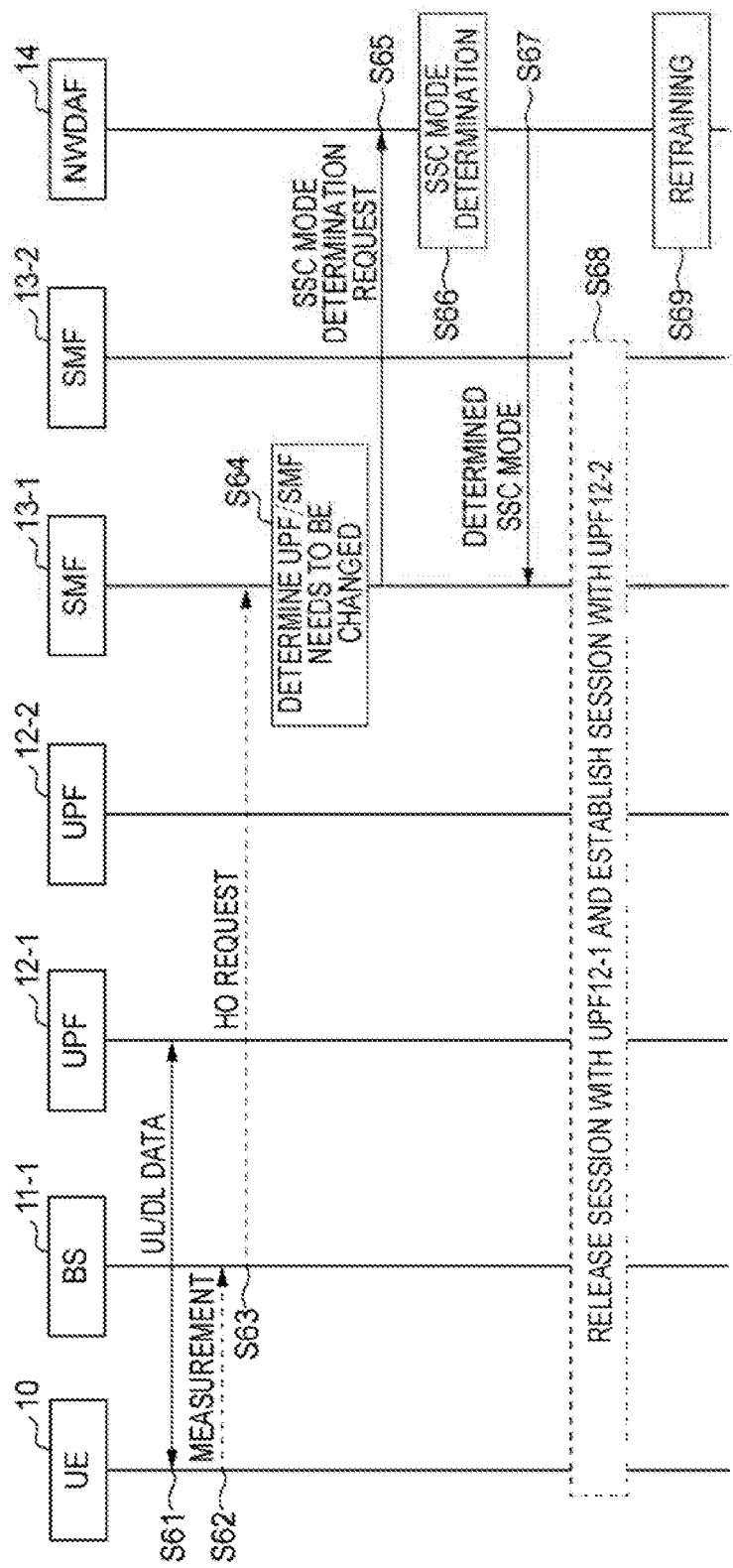
FIG. 6 illustrates a communication sequence diagram of SSC mode change control in a case where a NWDAF node determines an SSC mode.

Referring to FIG. 6, a process flow in a case the NWDAF node 14 determines an SSC mode is described. FIG. 6 illustrates a communication sequence diagram of SSC mode change control in a case where the NWDAF node 14 determines an SSC mode. FIG. 6 shows an example where the UE10 using SSC mode 3 (or SSC mode 2) in the cell 1 is to be determined to use SSC mode 2 (or SMF node 3) in the cell 2.

In S61, the UE10 is communicating data in Uplink (UL) and Downlink (DL) with the DN (not shown) via the base station 11-1 and the UPF 12-1. The UE 10 measures a reception quality of the cell 1 (i.e., a serving cell) and the cell 2 (i.e., an adjacent cell), generates a Measurement Report (MR), and transmits it to the base station 11-1 (S62). The base station 11-1 decides to start handover (HO) based on the measurement report and transmits a handover request to the SMF node 13-1 (S63).

The communicator 51 of the SMF node 13-1 receives the handover request, and the session manager 53 determines that a UPF/SMF needs to be changed (S64). Note that in FIG. 6, the SMF node 13-1 determines that a UPF/SMF needs to be changed because of the measurement report (S62) and handover request (S63), but other triggers may cause such a determination to be made. The SSC mode determinator 52 of the SMF node 13-1 transmits, via the communicator 51, an SSC mode determination request to the NWDAF node 14 (S65).

Figure 8:
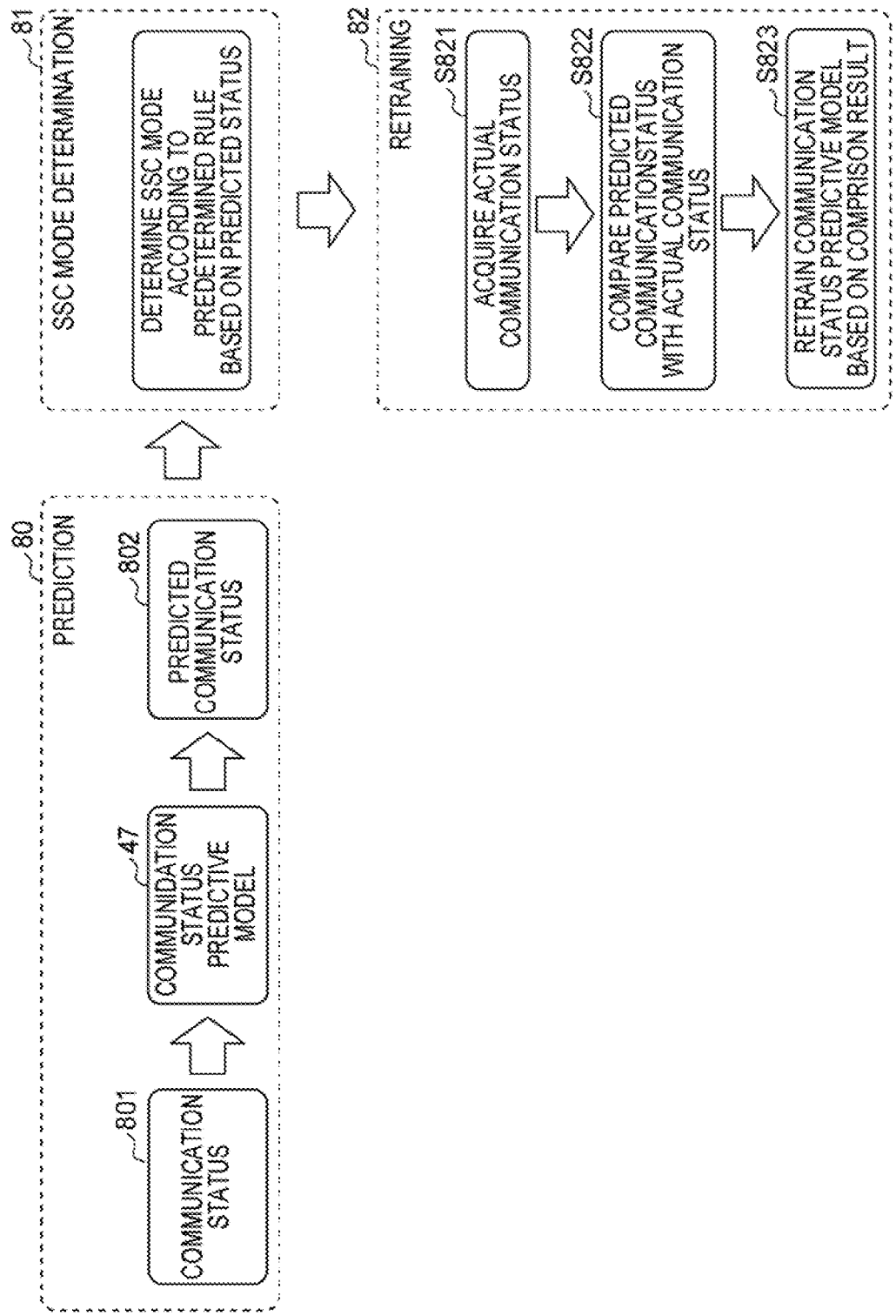
FIG. 8 is a schematic diagram showing flows of a prediction process, a SSC mode determination process, and a retraining process.

The NWDAF node 14 receives the SSC mode decision request by the communicator 41 and performs SSC mode determination process (S66). The SSC mode determination process in S66 is explained with reference to FIG. 8. FIG. 8 is a schematic diagram showing flows of a prediction process, an SSC mode determination process, and a retaining process. In S66, the prediction process 80 and the SSC mode determination process 81 are performed.

In the prediction process 80, the NWDAF node 14 acquires communication status data (communication status 801 before handover) for the UE 10 in the cell 1 via the communicator 41. As described above, the communication status data includes data related to the UE 10 and may also include the data related to the communication environment of the UE 10. The predictor 43 applies the communication status 801 to the communication status predictive model 47 to predict the communication status 802. The communication situation predictive model 47 is a learning model for machine learning that has been trained using training data that include communication situation data before and after handover. The communication status predictive model 47 is configured to output (infer) the communication status (communication status data) after handover using the communication status (communication status data) before handover as input. For example, after the communication status predictive model 47 was trained, the predictor 43 predicts whether any user is performing an operating on the display screen after handover. In other words, the predictor 43 applies the operation status for the display screen to the communication status predictive model 47 as the communication status before handover of a user, and the predictor 43 predicts an operation status after handover, i.e., whether the user is performing an operation on the display screen after handover.

Next, in the SSC mode determination process 81, the SSC mode determinator 44 of the NWDAF node 14 determines the SSC mode after handover based on the predicted communication status 802 using a predetermined rule. The SSC mode used before handover may also be used to determine the SSC mode after handover. The predefined rule is a rule that assigns each of the SSC modes to the communication status. An example of the rule for the UE 10 is described below.

(1) In a case where no operation by the UE 10 after handover is predicted (e.g., the display screen of the UE 10 is turned off): SSC mode 2

(2) In a case where an operation by the UE 10 after handover is predicted, and the operation is predicted to be completed in a relatively short time (e.g., an amount of communication packets until the end of the operation is less than a predetermined threshold), or in a case where a mobile speed of the UE 10 slower than a predetermined speed (e.g., walking level) is predicted and enough time before next handover is predicted: SSC mode 1

(3) In a case where an operation by the UE 10 after handover is predicted and the operation is predicted to continue for a relatively long time (e.g., an amount of communication packets until the end of the operation is above a predetermined threshold value: SSC mode 3

With the predetermined rule, the appropriate SSC mode is selected according to the predicted communication status. Note that the rule described above is just an example, and a rule based on time information, a mobility feature, or a communication environment, which may be included in the communication status data, may be used. The rule may be set in advance based on the feature of the SSC mode or by rule of thumb, but may be changed according to predetermined conditions.

Returning to the explanation in FIG. 6, in S67, the SSC mode determinator 44 of the NWDAF node 14 notifies SMF node 13-1 of the SSC mode determined in S66 via the communicator 41. Thereafter, the SMF node 13-1 release a session with the UPF node 12-1 and establishes a session with the UPF node 12-2 for the UE 10 (S68). In a case of changing from SSC mode 2 to SSC mode 3, the session establishment process is followed by the session release process. On the other hand, in a case of changing from SSC mode 3 to SSC mode 2, the session release process may be followed by the session establishment process.

After S67, the trainer 45 of the NWDAF node retrains the communication status predictive model 47 (S69). In S69, the retraining process 82 shown in FIG. 8 is performed. In FIG. 8, the communication status data acquirer 42 acquires the actual communication status data (actual communication status) after handover in S821. The trainer 45 compares the predicted communication status 802 with the actual communication status (S822) and trains (retrains) the communication status predictive model 47 based on the comparison result (S823).

The following is an example to which the rule (1) to (3) described above is applied. It is assumed that the communication status data acquirer 42 acquires that no operation of the UE 10 is being performed as the actual communication status (communication status data) of the UE 10 after handover (i.e., SSC mode 2 was appropriate). In addition, it is assumed that the communication status of the UE 10 predicted by the predictor 43 is that the UE 10 operation is being performed but the operation will be terminated in a relatively short time (i.e., SSC mode 1 should have been selected based on the prediction). In such a case, by comparing the actual communication status and the predicted communication status, the trainer 45 determines that they are different, and the correct information (i.e., that operation of the UE 10 is performing) to correspond to the input data (communication status before handover). Such retraining is expected to increase a prediction accuracy of the communication status predictive model 47.

<Process Flow (SMF Node 13-1 Determining SSC Mode)>

Figure 7:
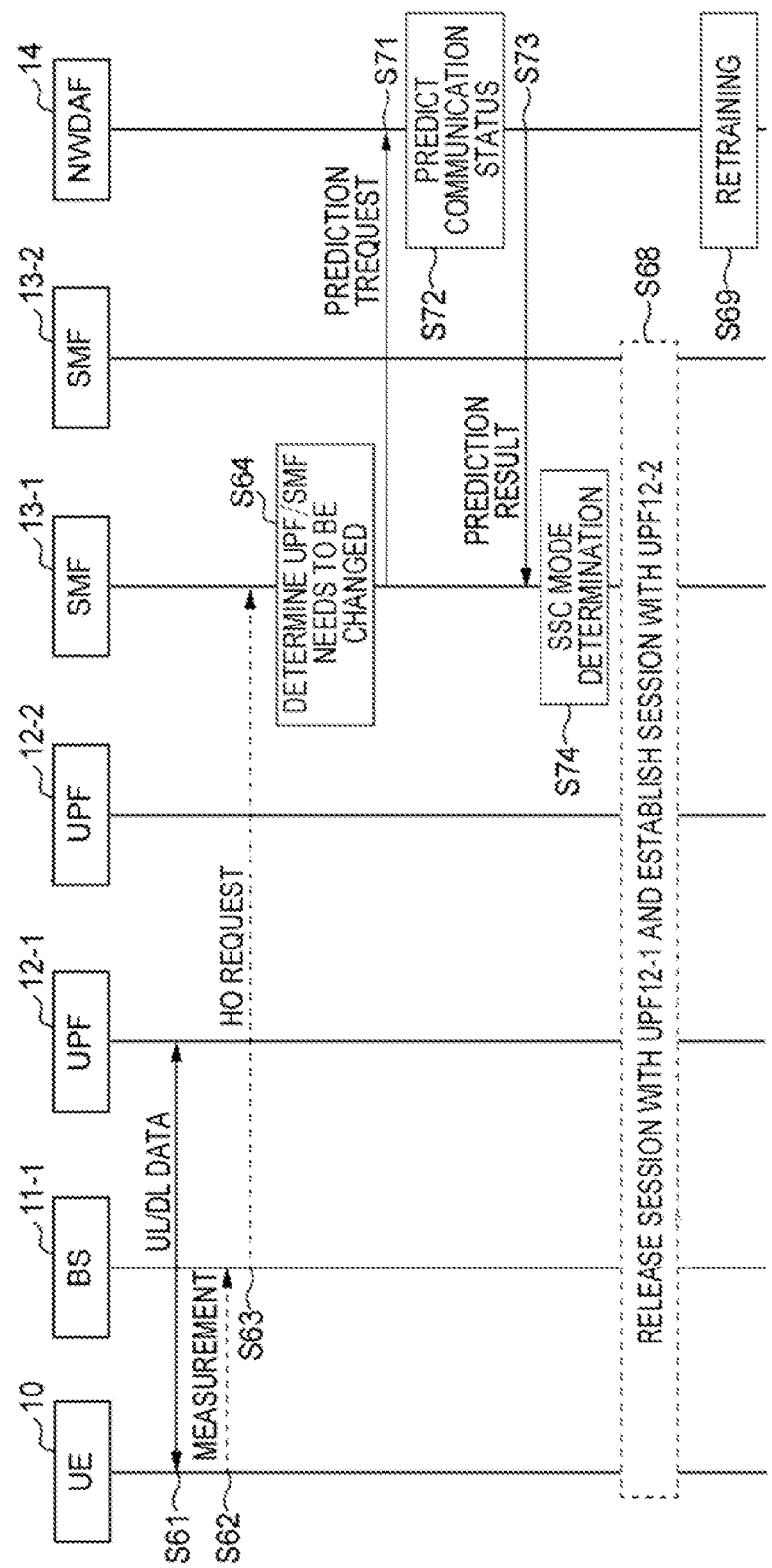
FIG. 7 illustrates a communication sequence diagram of SSC mode change control in a case where a SMF node determines an SSC mode.

Next, Referring to FIG. 7, a process flow in a case the SMF node 13-1 determines an SSC mode is described. FIG. 7 illustrate a communication sequence diagram of SSC mode change control in a case where the SMF node 13-1 determines an SSC mode. Similar to FIG. 6, FIG. 7 shows an example where the UE10 using SSC mode 3 (or SSC mode 2) in the cell 1 is to be determined to use SSC mode 2 (or SMF node 3) in the cell 2. Note that the same reference numbers are used for the same processes as in FIG. 6, and explanations are omitted.

In a case where the session manager 53 of SMF node 13-1 determines that a UPF/SMF needs to be changed (S64), the SSC mode determinator 52 transmits a prediction request of a communication status to the NWDAF node 14 via the communicator 51 (S71). In addition, the communication status data acquirer 54 may acquires communication status data from the UE 10 and transmits it to the NWDAF node 14. The predictor 43 of the NWDAF node 14 receives the prediction request via the communicator 41, it predicts communication status after handover according to the prediction process 80 shown in FIG. 8 (S72). The predictor of the NWDAF node 14 transmits the predicted communication status 802 as a prediction result via the communicator 41 to the SMF node 13-1 (S73). In S74, the SSC mode determinator of the SMF node 13 determine the SSC mode. The SSC mode determination process is the same as the SSC mode determination process 81 described above. The processes of S68 and S69 after determining the SSC mode are the same as those of SSC mode determination process 81 described above.

Note that the example where the SSC mode 3 (or SSC mode 2) is changed to SSC mode 2 (or SMF node 3) is described, but the SSC mode change process (including the prediction process 80 and the SSC mode determination process 81) may be applicable for any type of SSC mode change process.

As described above, according to the present embodiment, in a case where the UE 10 moves and performs handover, the optimal SSC mode after handover can be determined according to the predicted communication status. The communication status is predicted by a learning model for machine learning, and since the learning model is continuously retrained based on the actual communication status, the communication status can be predicted with high accuracy.

In the present embodiment, the communication status prediction and the SSC mode determination were made for the UE 10 performing handover. However, the present embodiment may be applied to any case where the communication status for the UE 10 changes, not limited to handover. For example, in a case where the wireless connection between the UE 10 and the base station 11 is lost and the UE 10 reconnects, the SSC mode to be used by the UE 10 after reconnection may be determined based on the communication status before the reconnection.

Modification 1

In the above embodiment, the process of determining the SSC mode after handover for the UE 10 is described. In practice, however, the number of UEs connected to a communication network is enormous, and the processing load to determine the SSC mode for all UEs with the above procedure is high. Therefore, for example, among a plurality of UEs, one or more UEs that satisfy a predetermined conditions may be selected (narrowed down) as the UEs subject to the SSC mode determination process. This narrowing down may be performed by an SMF node or a NWDAF node (e.g., the SMF node 13-1 or the NWDAF node 14 in FIG. 1) or by another device (including the UE itself). An example where the selection process is performed by the NWDAF node 14 is described.

For example, one or more of UEs, among a plurality of UEs, that are operating a predetermined application operation may be selected as the UEs subject to the SSC mode determination process. That is, the SSC mode determination process may be applied to one or more UEs for which the predetermined application operation has been acquired by the communication status data acquirer 42 as the communication status before handover. In this case, for one or more UEs for which the predetermined application operation was not acquired, the SSC Mode 2 may set to be used as the default.

As another example, a handover history (i.e., a history of connected base stations) of the UE may be used. For example, it is assumed that a past handover history acquired by the communication status data acquirer 42 is analyzed, and a predetermined number or more UEs that handover from a first base station to a second base station at a first timing and from the second base station to a third base station at a second timing are detected. In this case, it could be assumed that the detected UEs were moving by the same mobile objects such as a bus and train (having the same mobility feature). Therefore, in a case where one or more UEs that handover from the first base station to the second base station at the same timing are detected, the UEs are likely to move together by the mobile object and handover from the second base station to the third base station. Therefore, the detected UEs can be considered to be moving, and the SSC mode determination process may be applied to the UEs. In this case, it is possible to estimate the movement of the UEs without acquiring their mobility features. Note that time in a predetermined range from the first timing and time in a predetermined range from the second timing are considered to be the same as the first timing and the second timing, respectively.

As yet another example, for one or more UEs connected to a base station that forms a cell with more than a predetermined number of UEs that handover within a certain time, the SSC mode determination process may be applied.

Modification 2

In a case where SSC mode 3 is determined as the optimal SSC mode after handover, a release timing of a previously established session (i.e., an existing session) may be changed earlier than a predetermined timing based on the predicted communication status after handover. Such control may be performed by an SMF node or a NWDAF node (the SMF node 13-1 or the NWDAF node 14 in FIG. 1). An example where the SMF node 13-1 performs such control is described.

Figure 10:
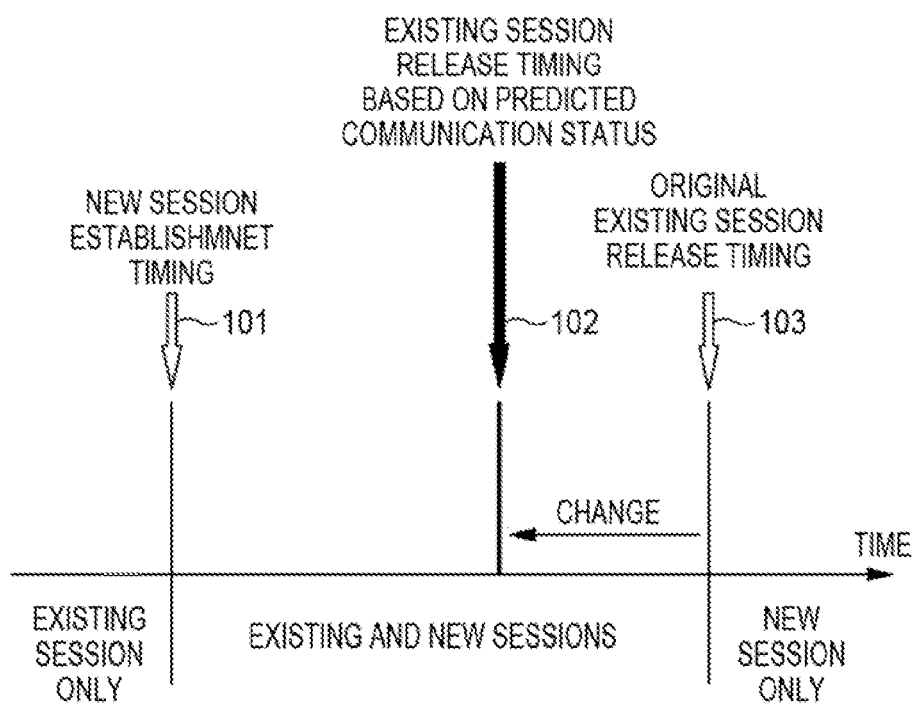
FIG. 10 illustrates an example of session control in a case of using SSC mode 3.

FIG. 10 illustrates an example of session control in a case of using SSC mode 3 after handover. In this example, a period between a new session establishment timing 101 to an original existing session (i.e., a previously established session) release timing 103 is assumed to be set in advance. In FIG. 10, before handover, the session manager 53 maintains the existing session. In a case where SSC mode 3 is determined as the optimal SSC mode after handover, the session manager 53 may change, based on the communication status data of the UE after handover acquired by the communication status data acquirer 54, an existing session release timing to earlier than the original existing session release timing 103. For example, in a case where the operation of the UE 10 is predicted to be completed by the original existing session release timing 103, the session manager 53 may change the existing session release timing to the timing 102 between the time when the operation of the UE 10 is predicted to end and the original existing session release timing 103 to release the existing session. This enables effective use of network resources.

In a case where such control is performed by the NWDAF node 14, the SSC mode determinator 44 may notify the SMF node 13-1 via communicator 41 of the existing session release timing, which is changed based on the communication status data acquired by communication status data acquirer 42. The session manager 53 of the SMF node 13-1 may receive the notification and change the existing session release timing to timing 102 to release the existing session.

While specific embodiments have been described above, the embodiments are illustrative only and are not intended to limit the scope of the present disclosure. The apparatus and method described herein may be embodied in other forms than as described above. In addition, it is also possible to appropriately omit, replace, and change the above-described embodiment without departing from the scope of the present disclosure. Such omissions, substitutions and alterations fall within the scope of the appended claims and their equivalents and fall within the scope of the present disclosure.

Embodiment of this Disclosure

This disclosure includes the following embodiments

[1] An information processing apparatus comprises: at least one processor, the at least one processor being configured execute processing, the processing comprises: an acquiring process for acquiring, from a communication apparatus, a communication status for the communication apparatus before handover; a prediction process for predicting, based on the communication status before handover, a communication status for the communication apparatus after handover using machine learning; a determination process for determining, based on the predicted communication status after handover, an SSC (Service and Session Continuity) mode to be used by the communication apparatus after handover.

[2] The information processing apparatus according to [1], wherein the communication status includes an operation status of the communication apparatus by a user.

[3] The information processing apparatus according to [2] or [3], wherein the prediction process includes predicting the communication status after handover using a learning model for machine learning which is configured to, from the communication status before handover, output the communication status after handover.

[4] The information processing apparatus according to any one of [1] to [3], wherein the acquiring process further includes acquiring, from the communication apparatus, an actual communication status for the communication apparatus after handover, and the processing further comprises: a training process for training the learning model using a result of a comparison between the communication status after handover predicted in the prediction process and the actual communication status acquired in the acquiring process.

[5] The information processing apparatus according to any one of [1] to [4], wherein the determination process includes determining, in a predefined rule, an SSC mode corresponding to the predicted communication status after handover as the SSC mode to be used by the communication apparatus.

[6] The information processing apparatus according to any one of [1] to [5], wherein the processing further comprises: a selection process for selecting one or more communication apparatuses from a plurality of communication apparatuses that satisfy a predetermined condition, and wherein the prediction process and the determination process are executed for each of the selected one or more communication apparatuses.

[7] The information processing apparatus according to [6], wherein the predetermined condition is that the communication status before handover includes an operation of a predetermined application.

[8] The information processing apparatus according to [6], wherein the predetermined condition is to have the same mobility feature.

[9] The information processing apparatus according to [6], wherein the predetermined condition is to be connected to a base station forming a cell in which a number of communication apparatuses that performs handover within a certain time is greater than a predetermined number.

[10] The information processing apparatus according to any one of [1] to [9], wherein the processing further comprises: a control process for controlling, in a case where the determined SSC mode is SSC mode 3, a release timing of a previously established session of two temporarily established sessions to be earlier than a preset timing, based on the predicted communication status after handover.

[11] The information processing apparatus according to any one of [1] to [10], wherein the information processing apparatus is an apparatus configured to function as a Network Data Analytic Function (NWDAF).

[12] A control apparatus comprises: at least one processor, the at least one processor being configured execute processing, the processing comprises: an acquiring process for acquiring, from another apparatus, a predicted communication status for a communication apparatus after handover, which is predicted by machine learning based on a communication status for the communication apparatus before handover; a determination process for determining, based on the predicted communication status after handover, an SSC (Service and Session Continuity) mode to be used by the communication apparatus after handover; and a session management process for performing session management for the communication apparatus to perform data communication in accordance with the determined SSC mode.

[13] The control apparatus according to [12], wherein the communication status includes an operation status of the communication apparatus by a user.

[14] The control apparatus according to [12] or [13], wherein the session management process includes controlling, in a case where the determined SSC mode is SSC mode 3, a release timing of a previously established session of two temporarily established sessions to be earlier than a preset timing, based on the predicted communication status after handover.

[15] The control apparatus according to any one of [12] to [14], wherein the control apparatus is an apparatus configured to function as a Session Management Function (SMF).

[16] A computer-implemented information processing method comprises: acquiring, from a communication apparatus, a communication status for the communication apparatus before handover; predicting, based on the communication status before handover, a communication status for the communication apparatus after handover using machine learning; and determining, based on the predicted communication status after handover, an SSC (Service and Session Continuity) mode to be used by the communication apparatus after handover.

[17] A computer-implemented control method comprises: acquiring, from another apparatus, a predicted communication status for a communication apparatus after handover, which is predicted by machine learning based on a communication status for the communication apparatus before handover, determining, based on the predicted communication status after handover, an SSC (Service and Session Continuity) mode to be used by the communication apparatus after handover; and performing session management for the communication apparatus to perform data communication in accordance with the determined SSC mode.

[18] A computer-readable storage medium storing a program, the program, when executed by at least one processor in an information processing apparatus, for causing the information processing apparatus to execute processing, the processing comprises: an acquiring process for acquiring, from a communication apparatus, a communication status for the communication apparatus before handover; a prediction process for predicting, based on the communication status before handover, a communication status for the communication apparatus after handover using machine learning; and a determination process for determining, based on the predicted communication status after handover, an SSC (Service and Session Continuity) mode to be used by the communication apparatus after handover.

[19] A computer-readable storage medium storing a program, the program, when executed by at least one processor in a control apparatus, for causing the control apparatus to execute processing, the processing comprises: an acquiring process for acquiring, from another apparatus, a predicted communication status for a communication apparatus after handover, which is predicted by machine learning based on a communication status for the communication apparatus before handover; a determination process for determining, based on the predicted communication status after handover, an SSC (Service and Session Continuity) mode to be used by the communication apparatus after handover; and a session management process for performing session management for the communication apparatus to perform data communication in accordance with the determined SSC mode.

REFERENCE SIGNS LIST

1; 2: Cell, 10: UE (Communication apparatus), 11-1; 11-2: Base station, 12-1; 12-2: UPF node, 13-1; 13-2: SMF node, 14: NWDAF node, 41: Communicator, 42: Communication status data acquirer, 43: Predictor, 44: SSC mode determinator, 45: Trainer, 46: Learning model storage device, 47: Communication status predictive model, 51: Communicator, 52: SSC mode determinator, 53: Session manager, 54: Communication status data acquirer

What is claimed is:

1. An information processing apparatus comprising:
   at least one processor,
   the at least one processor being configured execute processing, the processing comprising:
   an acquiring process for acquiring, from a communication apparatus, a communication status for the communication apparatus before handover;
   a prediction process for predicting, based on the communication status before handover, a communication status for the communication apparatus after handover using machine learning; and
   a determination process for determining, based on the predicted communication status after handover, an Service and Session Continuity (SSC) mode to be used by the communication apparatus after handover.

2. The information processing apparatus according to claim 1, wherein
   the communication status includes an operation status of the communication apparatus by a user.

3. The information processing apparatus according to claim 1, wherein
   the prediction process includes predicting the communication status after handover using a learning model for machine learning which is configured to, from the communication status before handover, output the communication status after handover.

4. The information processing apparatus according to claim 3, wherein
   the acquiring process further includes acquiring, from the communication apparatus, an actual communication status for the communication apparatus after handover, and
   the processing further comprising:
   a training process for training the learning model using a result of a comparison between the communication status after handover predicted in the prediction process and the actual communication status acquired in the acquiring process.

5. The information processing apparatus according to claim 1, wherein
the determination process includes determining, in a predefined rule, an SSC mode corresponding to the predicted communication status after handover as the SSC mode to be used by the communication apparatus.

6. The information processing apparatus according to claim 1, wherein
the processing further comprising:
a selection process for selecting one or more communication apparatuses from a plurality of communication apparatuses that satisfy a predetermined condition, and wherein
the prediction process and the determination process are executed for each of the selected one or more communication apparatuses.

7. The information processing apparatus according to claim 6, wherein
the predetermined condition is that the communication status before handover includes an operation of a predetermined application.

8. The information processing apparatus according to claim 6, wherein
the predetermined condition is to have the same mobility feature.

9. The information processing apparatus according to claim 6, wherein
the predetermined condition is to be connected to a base station forming a cell in which a number of communication apparatuses that performs handover within a certain time is greater than a predetermined number.

10. The information processing apparatus according to claim 1, wherein
the processing further comprising:
a control process for controlling, in a case where the determined SSC mode is SSC mode 3, a release timing of a previously established session of two temporarily established sessions to be earlier than a preset timing, based on the predicted communication status after handover.

11. The information processing apparatus according to claim 1, wherein
the information processing apparatus is an apparatus configured to function as a Network Data Analytic Function (NWDAF).

12. A control apparatus comprising:
at least one processor,
the at least one processor being configured execute processing, the processing comprising:
an acquiring process for acquiring, from another apparatus, a predicted communication status for a communication apparatus after handover, which is predicted by machine learning based on a communication status for the communication apparatus before handover;
a determination process for determining, based on the predicted communication status after handover, an Service and Session Continuity (SSC) mode to be used by the communication apparatus after handover; and
a session management process for performing session management for the communication apparatus to perform data communication in accordance with the determined SSC mode.

13. The control apparatus according to claim 12, wherein
the communication status includes an operation status of the communication apparatus by a user.

14. The control apparatus according to claim 12, wherein
the session management process includes controlling, in a case where the determined SSC mode is SSC mode 3, a release timing of a previously established session of two temporarily established sessions to be earlier than a preset timing, based on the predicted communication status after handover.

15. The control apparatus according to claim 12, wherein
the control apparatus is an apparatus configured to function as a Session Management Function (SMF).

16. A computer-implemented information processing method comprising:
acquiring, from a communication apparatus, a communication status for the communication apparatus before handover;
predicting, based on the communication status before handover, a communication status for the communication apparatus after handover using machine learning; and
determining, based on the predicted communication status after handover, an Service and Session Continuity (SSC) mode to be used by the communication apparatus after handover.

* * * * *